United States Patent
Ha et al.

(10) Patent No.: US 8,208,111 B2
(45) Date of Patent: Jun. 26, 2012

(54) METHOD OF FABRICATING A LIQUID CRYSTAL DISPLAY DEVICE USING A SIX MASK PROCESS

(75) Inventors: Yong Min Ha, Gyeongsangbuk-Do (KR); Han Wook Hwang, Gyeongsangbuk-Do (KR)

(73) Assignee: LG Display Co., Ltd., Seoul (KR)

( * ) Notice: Subject to any disclaimer, the term of this patent is extended or adjusted under 35 U.S.C. 154(b) by 289 days.

(21) Appl. No.: 11/436,902

(22) Filed: May 19, 2006

(65) Prior Publication Data

US 2006/0273315 A1 Dec. 7, 2006

(30) Foreign Application Priority Data

May 20, 2005 (KR) .................. 10-2005-0042701

(51) Int. Cl.
*G02F 1/136* (2006.01)
*G02F 1/1343* (2006.01)

(52) U.S. Cl. ........... 349/141; 249/47; 249/147; 249/148

(58) Field of Classification Search .................. 349/47, 349/141, 147, 148

See application file for complete search history.

(56) References Cited

U.S. PATENT DOCUMENTS

| | | | | |
|---|---|---|---|---|
| 2001/0005238 A1* | 6/2001 | Yun et al. | ......................... | 349/43 |
| 2001/0005253 A1* | 6/2001 | Komatsu | ....................... | 349/141 |
| 2003/0137621 A1* | 7/2003 | Zhang et al. | .................. | 349/106 |
| 2003/0169381 A1* | 9/2003 | Kawachi et al. | ................ | 349/43 |
| 2003/0234903 A1* | 12/2003 | Hong et al. | .................... | 349/141 |
| 2004/0041956 A1* | 3/2004 | Hwang | ........................... | 349/43 |

* cited by examiner

*Primary Examiner* — Jessica M Merlin
(74) *Attorney, Agent, or Firm* — McKenna Long & Aldridge LLP (57) ABSTRACT

An LCD device, and a fabrication method thereof, having a high aperture ratio and a high optical transmittance that enhances a fabrication yield and reduces the number of masks required in a fabrication process are disclosed. The LCD device includes a first substrate and a second substrate; a gate line arranged on the first substrate in one direction and having a transparent conductive layer formed of a transparent conductive material at a lower portion thereof; a data line; a thin film transistor; a first electrode formed on the first substrate and formed on the same layer as the transparent conductive layer; a second electrode having a plurality of slits and formed on a different layer from the first electrode, wherein the second electrode generates a horizontal field with a parabolic shape on the first substrate with the first electrode; and a liquid crystal layer.

13 Claims, 9 Drawing Sheets

METHOD OF FABRICATING A LIQUID CRYSTAL DISPLAY DEVICE USING A SIX MASK PROCESS

This application claims the benefit of Korean Patent Application No. 10-2005-0042701, filed on May 20, 2005, which is hereby incorporated by reference for all purposes as if fully set forth herein.

BACKGROUND OF THE INVENTION

1. Field of the Invention

The present invention relates to a liquid crystal display (LCD) device and a fabrication method thereof. More particularly, the present invention relates to an LCD device having a high aperture ratio and a high optical transmittance that enhance a fabrication yield and reduce a number of masks required in a fabrication method. The present invention also relates to a fabrication method of the LCD device.

2. Discussion of the Related Art

Recently, flat panel display devices, such as liquid crystal displays (LCDs), plasma display panels (PDPs), field emission displays (FEDs), and vacuum fluorescent displays (VFDs), have been developed because of their small size, light weight, and power-efficient operations. Various portable electric devices, such as mobile phones, personal digital assistants (PDAs), and notebook computers have been developed to incorporate these flat panel display devices. Of these flat panel display devices, LCDs are in high demand and are currently mass produced because of their simple driving scheme and superior image quality.

An LCD device is a display device that displays a desired image. The LCD device independently supplies a data signal to pixels arranged in a matrix according to image information. Thus an optical transmittance in each of the pixels is controlled. The LCD device may be driven by an active matrix (AM) method. The AM method serves to drive liquid crystal by applying a voltage to the liquid crystal through a switching device such as a thin film transistor (TFT) provided at each pixel.

LCD devices may be classified according to a method that drives liquid crystal molecules. Such classifications include an LCD device of a twisted nematic (TN) mode and an LCD device of an in-plan switching (IPS) mode. These modes are currently used.

A TN-mode LCD device drives liquid crystal molecules in a perpendicular direction relative to a substrate by turning on/off an electric field. The presence or absence of the electric field causes the direction of the liquid crystal molecules to have an angle of about 0°-90° based on the substrate.

However, because the TN-mode LCD device drives liquid crystal molecules in a perpendicular direction relative to a substrate, a narrow viewing angle is obtained. As a result, a color or a brightness of an image is varied according to an arrangement direction or an arrangement angle of the liquid crystal molecules in the LCD device. An in-plan switching (IPS) LCD device aids in solving this problem. In an IPS-mode LCD device, a wide viewing angle is implemented. That is, an in-plan electric field is applied to a substrate in a horizontal direction. The in-plan electric field drives liquid crystal molecules such that the direction of the liquid crystal molecules is parallel to a substrate along the electric field direction.

Figure 1:
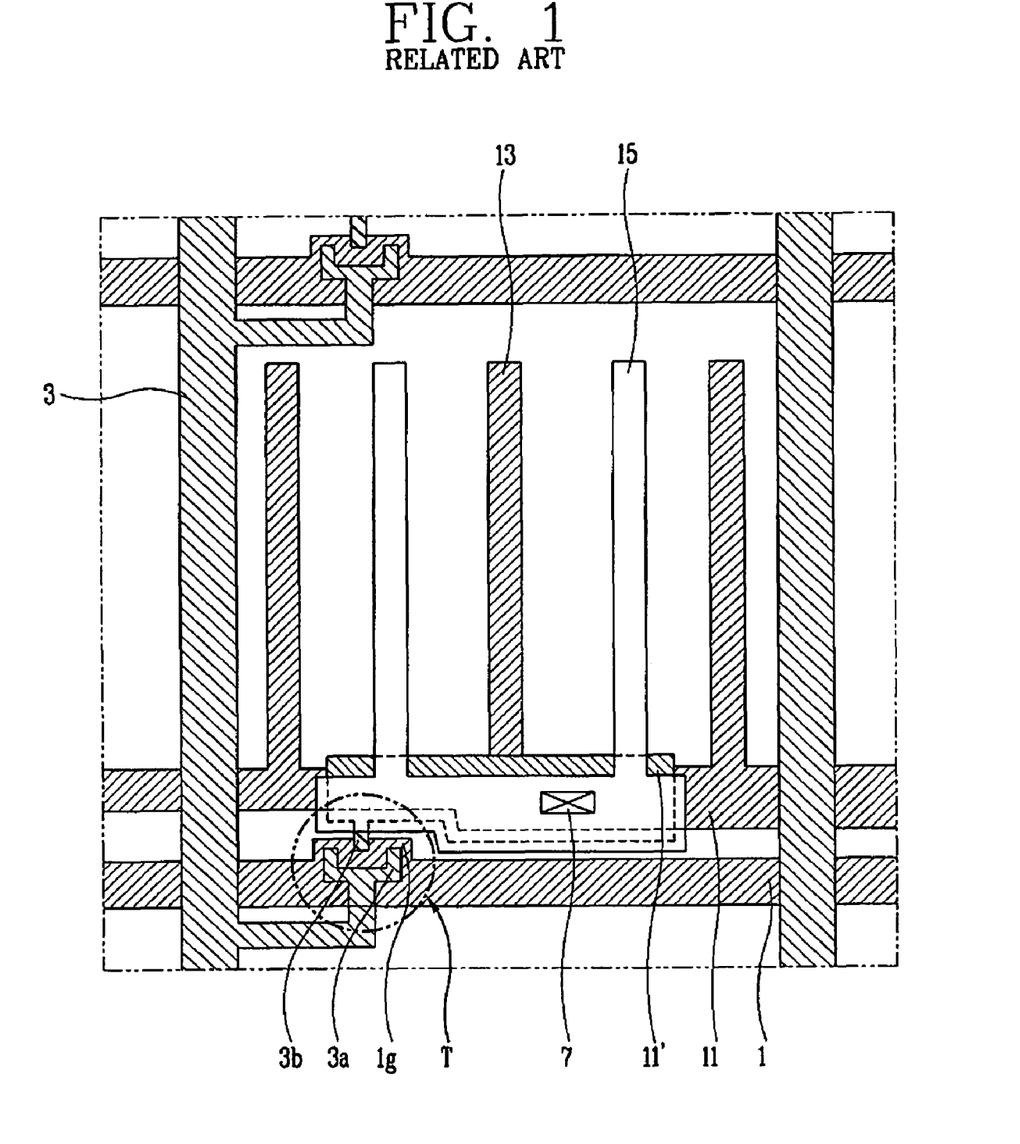
FIG. 1 is a plan view showing a unit pixel of an IPS-mode LCD device according to the related art.

When a voltage is applied to an electrode of the IPS-mode LCD device, a horizontal field is formed on a substrate that aligns liquid crystal molecules in a horizontal direction. Accordingly, the IPS-mode LCD device obtains a relatively wide viewing angle when compared with the TN-mode LCD device. FIG. 1 is a schematic view showing a unit pixel of an IPS-mode LCD device according to the related art.

As shown in FIG. 1, a gate line 1 and a data line 3 formed of a metal layer are arranged on a first substrate of an LCD device in horizontal and vertical directions, thereby defining a unit pixel. The pixels are implemented as n×m pixels on an LCD device as n gate lines 1 and m data lines 3 that cross one another. However, only one pixel is shown in FIG. 1.

A switching device, such as a thin film transistor (T) composed of a gate electrode 1g, a semiconductor layer (not shown), and source/drain electrodes 3a and 3b is formed at a crossing between the gate line 1 and the data line 3. The gate electrode 1g and the source/drain electrodes 3a and 3b are connected to the gate line 1 and the data line 3, respectively. The gate electrode 1g turns on the switching device by a signal input through the gate line 1, and the source/drain electrodes 3a and 3b transmit signals input through the data line 3 to the pixel.

A common line 11 that transmits a common signal is arranged in the unit pixel in parallel with the gate line 1. At least one pair of electrodes for switching liquid crystal molecules, such as a common electrode 13 and a pixel electrode 15, are arranged in the unit pixel in parallel with the data line 3, thereby generating a horizontal electric field parallel with a surface of the substrate.

The common electrode 13 may be simultaneously formed with the gate line 1, and connected to the common line 11. The pixel electrode 15 may be formed on a passivation layer (not shown) formed on an entire surface of the substrate including the source/drain electrodes 3a and 3b, and is connected to the drain electrode 3b through a contact hole 7.

A storage electrode 11' extending from the drain electrode 3b overlaps with the common line 11. A gate insulating layer (not shown) is interposed between the storage electrode 11' and the common line 11, thereby forming a storage capacitor.

A black matrix that prevents light from leaking into the thin film transistor, the gate line 1, the data line 3, and a color filter layer that implements colors are formed on a second substrate (not shown). An overcoat layer that planarizes the color filter layer is formed on the color filter layer.

An alignment layer (not shown) that determines an initial alignment direction of liquid crystal is formed on each facing surface of the first substrate and the second substrate, and a liquid crystal layer is formed between the first substrate and the second substrate.

In the IPS-mode LCD device, the common electrode 13 and the pixel electrode 15 are arranged on the same substrate to generate a horizontal electric field. Also, liquid crystal molecules of the liquid crystal layer are driven such that they are parallel with the substrate by the horizontal field. Therefore, an image of the LCD device may be displayed in upper and lower directions and right and left directions. That is, a wide viewing angle in upper and lower directions and right and left directions may be obtained.

However, in the related art IPS-mode LCD device, the common electrode 13 and the pixel electrode 15 of an opaque metal layer are arranged in a pixel region for displaying an image. Therefore, an aperture ratio of the LCD device is decreased, and an optical transmittance is lowered. Furthermore, a backlight having a higher intensity is required in order to achieve a desired brightness of the LCD device, thereby increasing power consumption.

In order to solve the above-mentioned problems, a method for forming a pair of electrodes with a transparent conductive material has been proposed. However, the method only slightly increases an aperture ratio and an optical transmittance was not greatly improved due to the following reasons. Liquid crystal molecules positioned at an upper region of an electrode having a wide width in order to generate a horizontal field of certain intensity are not influenced by the horizontal field. Therefore, the liquid crystal molecules maintain the initial arrangement, and thus an optical transmittance is not improved. Even if both the common electrode and the pixel electrode are formed of a transparent conductive material, the transparent conductivity influences an edge of the electrode to increase a white brightness without influencing a middle region of the electrode.

SUMMARY OF THE INVENTION

Accordingly, the present invention is directed to a liquid crystal display (LCD) device and a fabrication method thereof that substantially obviate one or more of the problems due to limitations and disadvantages of the related art.

An advantage of the present invention is to provide an IPS-mode LCD device that implements a high aperture ratio and a high optical transmittance by evenly passing light through an electrode surface of the LCD device, and a fabrication method thereof.

Another advantage of the present invention is to provide a method for fabricating an IPS-mode LCD device having a high aperture ratio and a high optical transmittance that reduces the number of masks required in a fabrication process and enhances a fabrication yield.

Additional features and advantages of the invention will be set forth in the description which follows, and in part will be apparent from the description, or may be learned by practice of the invention. The objectives and other advantages of the invention will be realized and attained by the structure and method particularly pointed out in the written description and claims hereof as well as the appended drawings.

To achieve these and other advantages and in accordance with the purpose of the present invention, as embodied and broadly described, a liquid crystal display (LCD) device having a high aperture ratio and a high optical transmittance includes a first substrate and a second substrate facing each other separated by a cell gap; a gate line arranged on the first substrate in one direction and having a lower transparent conductive layer and an upper metal layer; a data line formed on the first substrate to cross the gate line to form a unit pixel; a thin film transistor formed at a crossing of the gate line and the data line and including a gate electrode branched from the gate line; a first electrode formed on the first substrate and formed on the same layer as the transparent conductive layer; a second electrode having a plurality of slits and formed on a different layer from the first electrode, wherein the second electrode generates a horizontal field with a parabolic shape on the first substrate with the first electrode; and a liquid crystal layer formed at a space between the first substrate and the second substrate.

In another aspect of the present invention, a method for fabricating a liquid crystal display (LCD) device includes preparing a first substrate; forming a polycrystalline silicon layer on the first substrate; patterning the polycrystalline silicon layer using a first mask process to form an active layer; forming a gate insulating layer on the first substrate including the active layer; sequentially forming a first transparent conductive layer and a first metal layer on the gate insulating layer; simultaneously patterning the first transparent conductive layer and the first metal layer using a second mask process to form a gate line, a gate electrode, and a first electrode; forming a source region and a drain region on the active layer; forming an intermediate layer on the first substrate including the gate line, the gate electrode, and the first electrode; etching the gate insulating layer and the intermediate layer formed at each region on the active layer using a third mask process to form a first contact hole and a second contact hole, and etching the first metal layer and the intermediate layer on the first electrode to expose the first electrode; forming a second metal layer on the intermediate layer; patterning the second metal layer using a fourth mask to form a data line, a source electrode, and a drain electrode; forming a passivation layer on the first substrate including the data line, the source electrode, the drain electrode, and the first electrode; partially etching the passivation layer using a fifth mask process; forming a second transparent conductive layer on the passivation layer; and patterning the second transparent conductive layer using a sixth mask process to form a second electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to an embodiment of the present invention, example of which is illustrated in the accompanying drawings.

A liquid crystal display (LCD) having a high aperture ratio and a high optical transmittance, and a fabrication method thereof, will be explained with reference to the attached drawings.

Figure 2A:
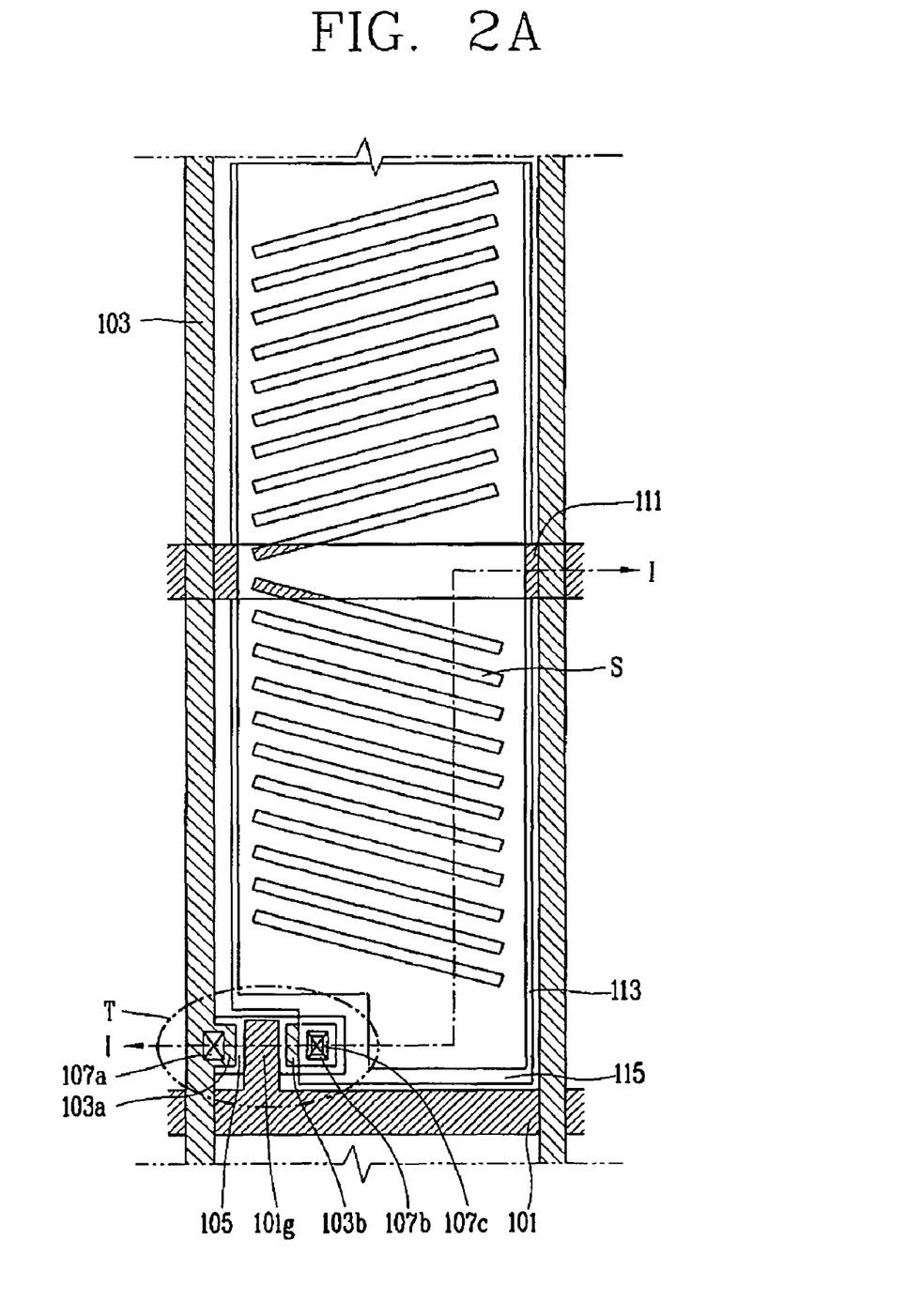
FIG. 2A is a plan view showing a unit pixel of an IPS-mode LCD device according to an embodiment of the present invention.
Figure 2B:
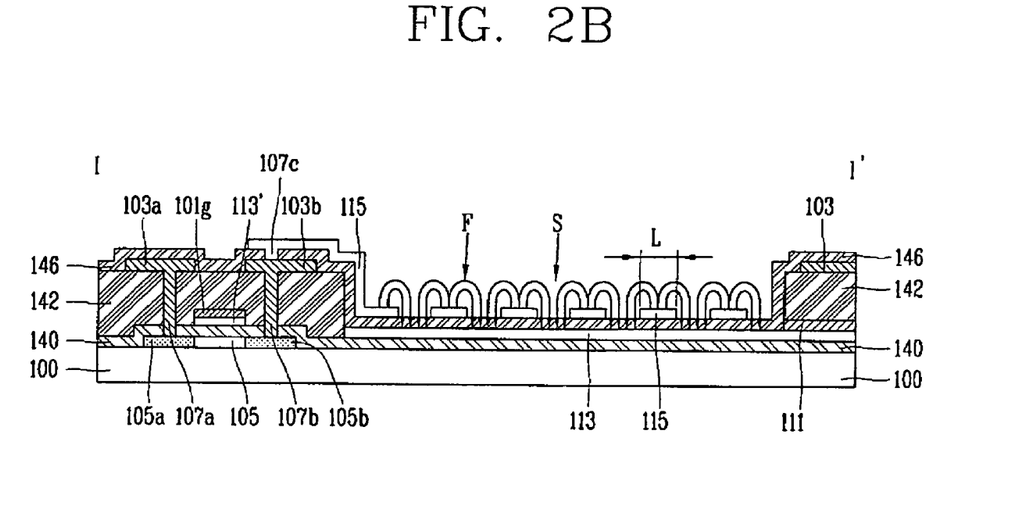
FIG. 2B is a sectional view taken along line I-I' of FIG. 2A.

FIG. 2A is a plan view showing a unit pixel of an IPS-mode LCD device according to a first embodiment of the present invention, and FIG. 2B is a sectional view taken along line I-I' of FIG. 2A.

As shown, a plurality of gate lines 101 and data lines 103 may be arranged on a first substrate 100 in a matrix. A pair of adjacent gate lines 101 and a pair of adjacent data lines 103 cross one another to define each unit pixel. The gate line is formed of a metal layer, and a transparent conductive layer 113' is formed at a lower portion of the gate line 101.

A switching device, such as a thin film transistor T, may be formed at a crossing between the gate line 101 and the data line 103 as a low temperature polycrystalline thin film transistor. The thin film transistor may include a polycrystalline silicon type active layer 105 having a source region 105a and a drain region 105b; a gate insulating layer 140 formed on the active layer 105; a gate electrode 101g formed on the gate insulating layer 140 and branched from the gate line 101; an intermediate layer 142 formed on the gate electrode 101g; a first contact hole 107a and a second contact hole 107b formed on the intermediate layer 142, and exposing the source region 105a and the drain region 105b of the active layer 105, respectively; and a source electrode 103a and a drain electrode 103b formed on the intermediate layer 142 with a gap therebetween. The source electrode protrudes from the data line 103, and is connected to the source region 105a through the first contact hole 107a. One side of the drain electrode 103b is connected to the drain region 105b through the second contact hole 107b, and another side of the drain electrode 103b is connected to a second electrode 115 through a third contact hole 107c formed on a passivation layer 146 to apply a data signal to the unit pixel.

The polycrystalline silicon type thin film transistor has a field effect mobility greater than that of the related art amorphous silicon type thin film transistor to achieve a fine pixel pitch and a high aperture ratio of the LCD device. Furthermore, when a low temperature process type thin film transistor is used, a cheap glass substrate is applied to provide a large LCD device having a fine pixel pitch and a low price.

In the unit pixel according to the first embodiment of the present invention, a first electrode 113 with a plate shape that receives a common signal from a common line 111 of a metal layer formed at a middle portion of the unit pixel and a second electrode 115 having a plurality of slits S overlapping with each other such that the passivation layer 146 is interposed therebetween. As the result, an electric field for driving liquid crystal is generated on the first substrate 100.

The first electrode 113 and the second electrode 115 may be formed of at least one transparent conductive material selected from a group including an indium tin oxide (ITO), an indium zinc oxide (IZO), or an indium tin zinc oxide (ITZO). The first electrode 113 may be patterned in the same layer as the first transparent conductive layer 113' arranged at a lower portion of the gate line 101. A distance between the first electrode 113 and the second electrode 115 may be formed to be smaller than a cell gap of a liquid crystal panel so that an electric field generated between the first electrode 113 and the second electrode 115 can be a horizontal electric field F with a parabolic shape. A gap between the slits S of the second electrode 115, that is, a width L of the second electrode, must be large enough to form an equi-potential line on the second electrode 115. This enables the liquid crystal molecules on the second electrode 115 to be completely operational when a voltage is applied between the first electrode 113 and the second electrode 115. Therefore, it is preferable that the gap between the slits S of the second electrode is formed to be narrow. However, because an electric field applied between the first electrode and the second electrode has to have a large enough intensity to drive the liquid crystal, the gap between the slits of the second electrode has to be large enough to accommodate the desired intensity. Therefore, the width of the second electrode has to be determined with consideration of the above aspects. Each long axis of each of the liquid crystal molecules on the second electrode 115 is twisted by the horizontal electric field F with a parabolic shape generated between the first electrode and the second electrode. As the result, a user can view the long axes of the liquid crystal molecules in every direction, and thus a viewing angle of the LCD device is improved. Furthermore, in the LCD device of the present invention, an image is displayed by evenly passing light through upper surfaces of the first electrode 113 and the second electrode 115. Therefore, an aperture ratio and an optical transmittance are greatly enhanced compared to those of the related art IPS-mode LCD device.

In the LCD device of the present invention, an overlapped region between the first electrode 113 and the second electrode 115 is increased to a greater degree than that of the related art IPS-mode LCD device. Therefore, a storage capacitance is increased. Thus, a voltage lowering ($\Delta Vp$) of the electrode that receives a data signal is decreased to thereby implement a high aperture ratio and a high optical transmittance. This increases the electric field and enhances the display quality on a screen.

The slits S of the second electrode 115 may be formed to have an inclination angle of approximately 45° relative to the data line 103 so that an electric field may be generated between the first electrode 113 and the second electrode 115 in a direction having an inclination angle of approximately 45° relative to the data line 103. When the horizontal electric field for driving liquid crystal has an inclination angle, a rubbing direction of an alignment layer becomes perpendicular to the data line 103 in correspondence with the inclination angle. That is, the rubbing direction for an initial alignment of liquid crystal molecules is the same as the direction of an electric field generated between the data line 103 and the second electrode 115. Accordingly, even when a voltage is not applied to the LCD device, known as a black and white mode, liquid crystal molecules near the data line 103 are not distorted by the voltage generated between the data line 103 and the second electrode 115. Therefore, a width of a black matrix on the second substrate corresponding to the region near the data line 103 can be minimized, and thus the brightness and the aperture ratio of the LCD device are enhanced.

In the present invention, the first electrode and the second electrode may be arranged to be symmetrical to each other on the basis of the common line 111. That is, the common line 111 of a metal layer may be arranged in the middle of the unit pixel, and the first electrode 113 and the second electrode 115 may be arranged to be symmetrical to each other up and down on the basis of the common line 111. Thus, a color shift may be prevented and a wide viewing angle may be obtained.

Although not shown, a color filter layer for implementing red, green, and blue colors may be formed on the second substrate facing the first substrate 100 separated by a first distance. A liquid crystal layer is formed between the first substrate and the second substrate.

Figure 3A:
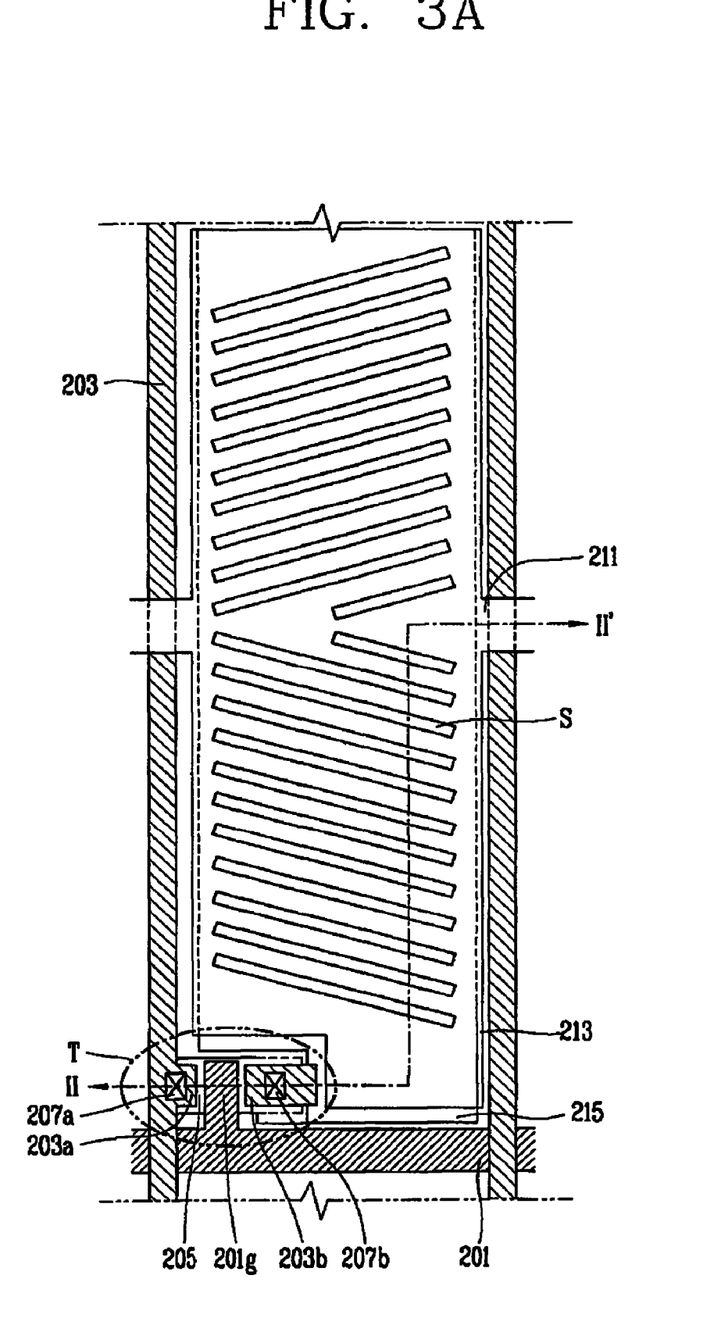
FIG. 3A is a plan view showing a unit pixel of an IPS-mode LCD device according to another embodiment of the present invention.
Figure 3B:
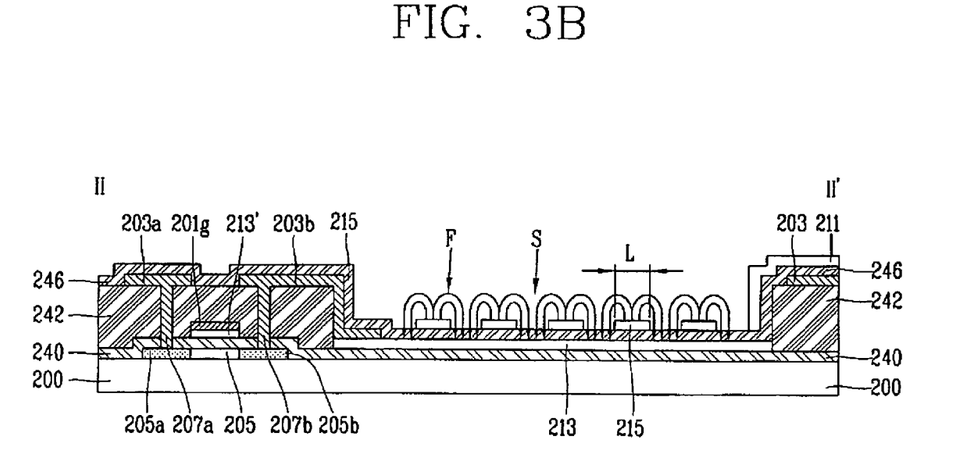
FIG. 3B is a sectional view taken along line II-II' of FIG. 3A.

In the unit pixel according to the second embodiment of the present invention, the first electrode 213 with a plate shape is a pixel electrode that receives a data signal, and the second electrode 215 having a plurality of slits S is a common electrode that receives a common signal. The LCD device according to the second embodiment has a similar construction as that according to the first embodiment, and thus differences therebetween will be explained.

FIG. 3A is a plan view showing a unit pixel of an IPS-mode LCD device according to a second embodiment of the present invention, and FIG. 3B is a sectional view taken along line II-II' of FIG. 3A.

As shown, a plurality of gate lines 201 and data lines 203 may be arranged on a first substrate 200 in a matrix. The gate line 201 and the data line 203 cross each other to define a unit pixel. The gate line 201 is formed of a gate metal layer, and a first transparent conductive layer 213' is formed at a lower portion of the gate line 201.

A switching device, such as a thin film transistor T, may be formed at a crossing of the gate line 201 and the data line 203 as a low temperature polycrystalline thin film transistor. The thin film transistor may include a polycrystalline silicon type active layer 205 having a source region 205a and a drain region 205b; a gate insulating layer 240 formed on the active layer 205; a gate electrode 201g formed on the gate insulating layer 240 and branched from the gate line 201; an intermediate layer 242 formed on the gate electrode 201g; a first contact hole 207a and a second contact hole 207b formed in the intermediate layer 242 and exposing the source region 205a and the drain region 205b of the active layer 205, respectively; and a source electrode 203a and a drain electrode 203b formed on the intermediate layer 242 with a gap therebetween. The source electrode 203a protrudes from the data line 203 and is connected to the source region 205a through the first contact hole 207a. The drain electrode 203b is connected to the drain region 205b through the second contact hole 207b.

In the unit pixel according to the second embodiment of the present invention, a first electrode 213 with a plate shape connected to the drain electrode 203b that receives a data signal and a second electrode 215 having a plurality of slits S that receives a common signal from a gate pad (not shown) overlap each other such that a passivation layer 246 is interposed therebetween. As the result, an electric field for driving liquid crystal is generated on the first substrate 200.

The first electrode 213 and the second electrode 215 are formed of at least one transparent conductive material selected from a group including an indium tin oxide (ITO), an indium zinc oxide (IZO), or an indium tin zinc oxide (ITZO).

A common line 211 that transmits a common signal to the second electrode 215 is formed on the passivation layer 246, and is formed of the same transparent conductive layer as the second electrode 215 to increase brightness of the LCD device.

A distance between the first electrode 213 and the second electrode 215 is formed to be smaller than a cell gap of a liquid crystal panel so that a horizontal electric field F with a parabolic shape may be generated between the first electrode 213 and the second electrode 215. A gap between the slits S of the second electrode 215, that is, a width L of the second electrode, is formed to have a gap large enough to completely drive liquid crystal molecules on the second electrode 215 by the horizontal electric field F with a parabolic shape between the first electrode and the second electrode. Therefore, it is preferable that the gap between the slits S of the second electrode is formed to be narrow. However, because an electric field applied between the first electrode and the second electrode has to have a large enough intensity to drive the liquid crystal, the gap between the slits of the second electrode has to be large enough to accommodate the desired intensity. Therefore, the width of the second electrode has to be determined with consideration of the above aspects.

The slits S of the second electrode 215 are formed to have an inclination angle of approximately 45° relative to the data line 203 so that an electric field can be generated between the first electrode 213 and the second electrode 215 in a direction having an inclination angle of approximately 45° relative to the data line 203. When the horizontal electric field for driving liquid crystal has an inclination angle, a rubbing direction of an alignment layer becomes perpendicular to the data line 203 in correspondence with the inclination angle. That is, the rubbing direction for an initial alignment of liquid crystal molecules is the same as the direction of an electric field generated between the data line 203 and the second electrode 215. Accordingly, even when a voltage is not applied to the LCD device, i.e., a black and white mode, liquid crystal molecules near the data line 203 are not distorted by the voltage generated between the data line 203 and the second electrode 215. Therefore, a width of a black matrix on the second substrate corresponding to the region near the data line 103 is minimized, and thus the brightness and the aperture ratio of the LCD device are enhanced.

In the present invention, the first electrode 213 and the second electrode 215 may be arranged to be symmetrical to each other on the basis of the common line 111 in the unit pixel. That is, the common line 211 of a metal layer may be arranged in the middle of the unit pixel, and the first electrode 213 and the second electrode 215 may be arranged to be symmetrical to each other up and down on the basis of the common line 111. Thus, a color shift is prevented and a wide viewing angle is obtained.

Figure 4A:
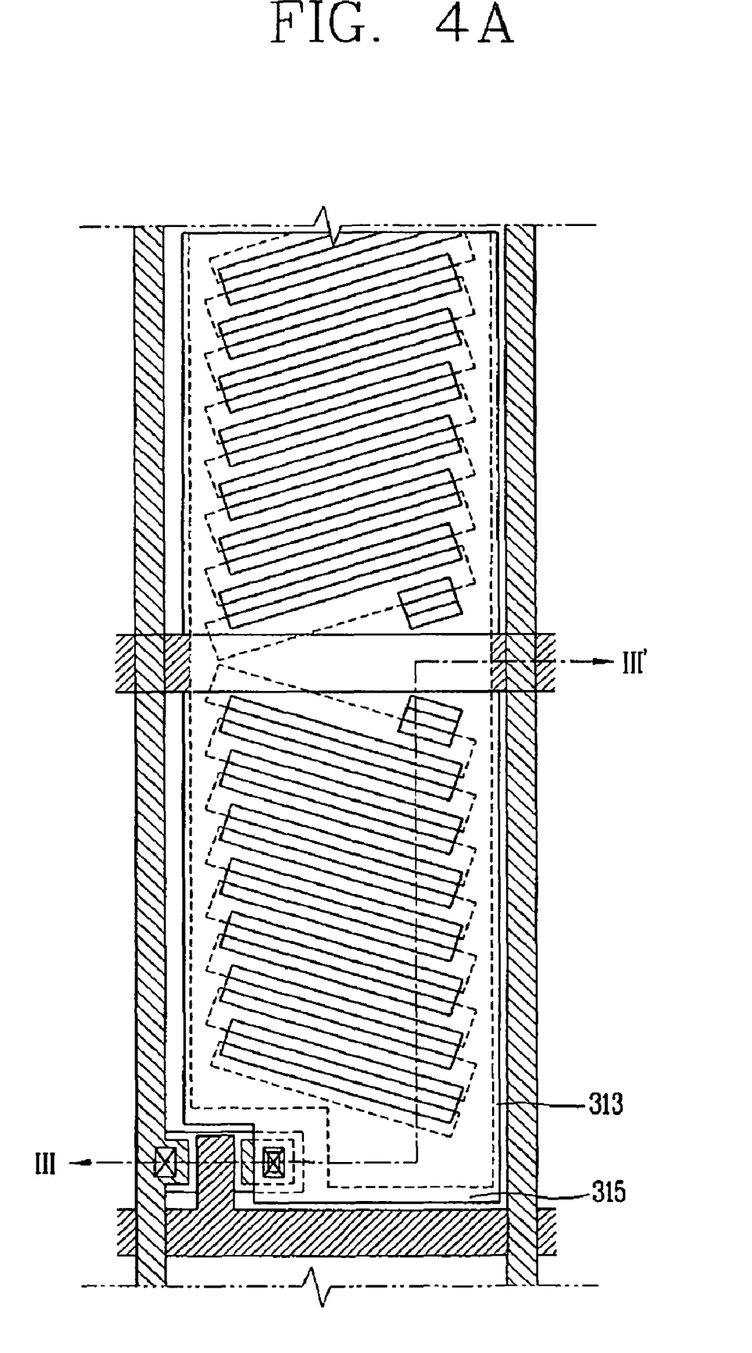
FIG. 4A is a plan view showing a unit pixel of an IPS-mode LCD device according to another embodiment of the present invention.
Figure 4B:
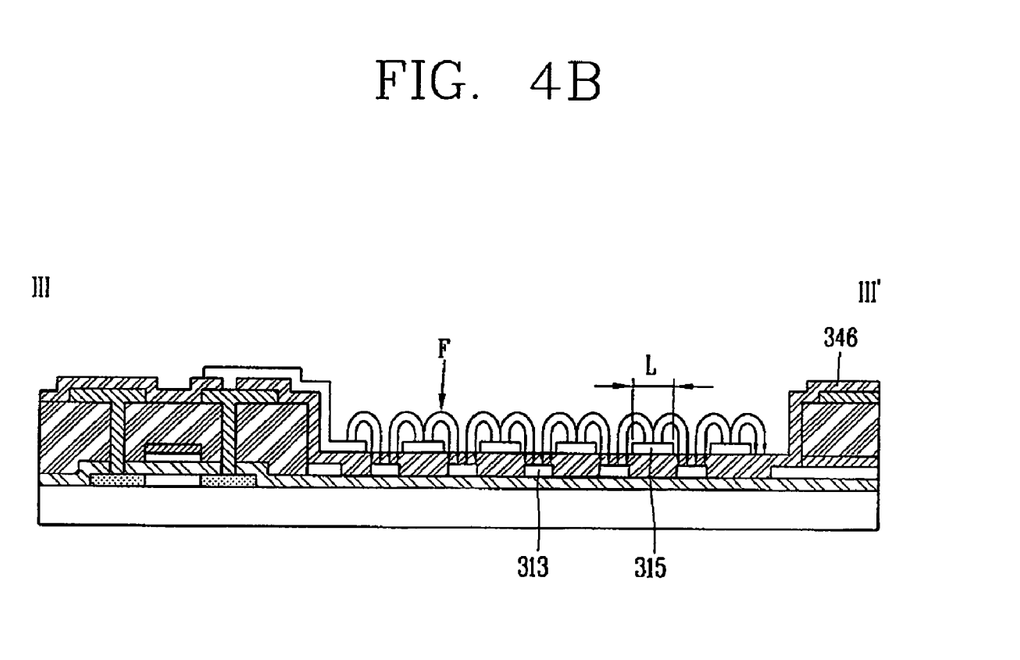
FIG. 4B is a sectional view taken along line III-III' of FIG. 4A.

In a unit pixel according to a third embodiment of the present invention, a first electrode 313 and a second electrode 315 include a plurality of slits S, respectively. The slits S of the first electrode 313 and the slits S of the second electrode 315 are formed to alternate one with another in parallel, thereby generating a horizontal electric field with a parabolic shape on the first substrate 300. The LCD device according to the third embodiment has a similar construction as that according to the first embodiment, and thus differences therebetween will be explained.

FIG. 4A is a plan view showing a unit pixel of an IPS-mode LCD device according to a third embodiment of the present invention, and FIG. 4B is a sectional view taken along line III-III' of FIG. 4A. As shown, the first electrode 313 and the second electrode 315 respectively having a plurality of slits S that overlap with each other such that a passivation layer 346 is interposed therebetween. Thereby, an electric field is generated to drive liquid crystal on the first substrate 300. A distance between the first electrode 313 and the second electrode 315 is formed to be smaller than a cell gap of a liquid crystal panel so that a horizontal electric field F with a parabolic shape can be generated between the first electrode 313 and the second electrode 315. A gap between the slits S of the second electrode 315, that is, a width L of the second electrode, has to be large enough to completely drive liquid crystal molecules on the first substrate 300 when a voltage is applied between the first electrode 313 and the second electrode 315. Therefore, it is preferable that the gap between the slits S of the second electrode 315 is formed to be narrow. However, because an electric field applied between the first electrode and the second electrode has to have a large enough intensity to drive liquid crystal, the gap between the slits of the second electrode has to be large enough to accommodate the desired intensity.

Therefore, in the present invention, the viewing angle, aperture ratio, and optical transmittance are greatly enhanced versus those of the related art IPS-mode LCD device.

Hereinafter, a method for fabricating an LCD device having a high aperture ratio and a high optical transmittance according to the present invention will be explained with reference to the attached drawings.

FIGS. 5A to 5I are views showing processes for fabricating an IPS-mode LCD device taken along line I-I' of FIG. 2A.

Figure 5A:
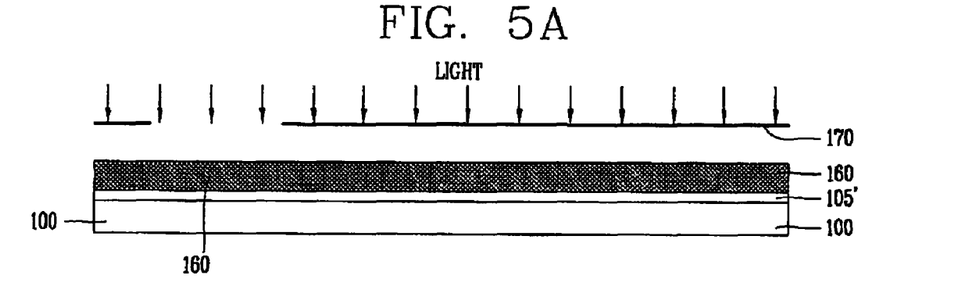
FIGS. 5A, 5B, 5C, 5D, 5E, 5F, 5G, 5H and 5I are views showing processes for fabricating an IPS-mode LCD device taken along line I-I' of FIG. 2A.

As shown in FIG. 5A, a first substrate 100, which may be formed of glass or quartz, is prepared. Then, a polycrystalline silicon layer 105' is formed on the first substrate 100.

In order to form the polycrystalline silicon layer 105', an amorphous silicon layer may be deposited on the first substrate 100 by a plasma enhanced chemical vapor deposition (PECVD), etc. at a certain thickness. Then, the amorphous silicon layer may be dehydrogenated and crystallized.

The dehydrogenation process serves to remove hydrogen inside the amorphous silicon layer. According to the dehydrogenation process, the amorphous silicon layer is put into a heating furnace, and then is heated at a temperature of approximately 400° C. The amorphous silicon layer includes a large amount of hydrogen ions that interrupt a crystallization process therein that results from an unstable coupling between molecules generated when the amorphous silicon layer is formed. When the molecules are coupled to each other in an unstable amorphous state, hydrogen is coupled to each residual coupling group of the molecules. The hydrogen will be a defect when the amorphous silicon is crystallized and will cause damage to the silicon layer in a crystallization process. Therefore, the hydrogen has to be removed prior to the crystallization process.

The crystallization process can be performed by a heating method in which an amorphous silicon layer is disposed in a heating furnace at a high temperature and then is heated or by a laser crystallization method in which an amorphous silicon layer is instantaneously heated to be crystallized by excimer laser energy. The laser crystallization method can generate a field effect mobility greater than that of the heating method because the grain size can be increased during the crystallization process. Therefore, the laser crystallization method is preferably used in a step of forming a thin film transistor requiring high speed operation.

Although not shown, a buffer layer formed of SiOx or SiNx may be formed on the first substrate 100 before forming the polycrystalline silicon layer 105'. Herein, the buffer layer prevents impurities occurring inside the first substrate 100 from entering into the polycrystalline silicon layer 105' due to the heating of the polycrystalline silicon layer 105'. As a temperature of the first substrate 100 is increased when a thermal process for changing the amorphous silicon layer into a polycrystalline silicon is performed, these impurities may occur.

Figure 5B:
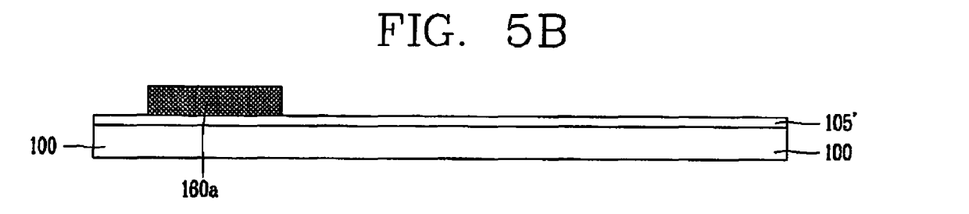

Upon completing the formation of the polycrystalline silicon layer 105', a photoresist 160 is formed on the polycrystalline silicon layer 105'. Although not shown, the deposited photoresist 160 is baked at a certain temperature. Then, light such as ultraviolet rays is irradiated onto the photoresist 160 through a first mask 170 positioned on the photoresist 160, and then developer is applied onto the photoresist 160. As a result, as shown in FIG. 5B, a photoresist pattern 160a with a certain area is formed on the polycrystalline silicon layer 105'. Herein, the photoresist is a negative photoresist, and a region to which ultraviolet rays has not been irradiated is removed by the developer.

Figure 5C:
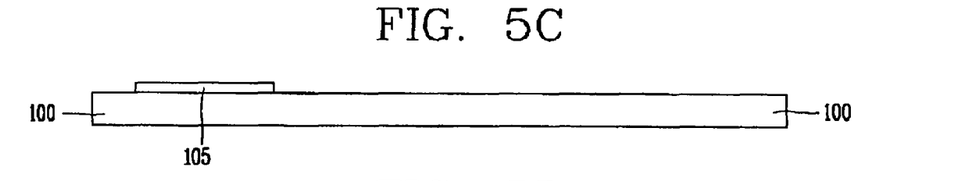

Then, when the polycrystalline silicon layer 105' is partially blocked by the photoresist pattern 160a, an etchant is applied onto the polycrystalline silicon layer 105'. As a result, as shown in FIG. 5C, an active layer 105 is formed on the first substrate 100.

Figure 5D:
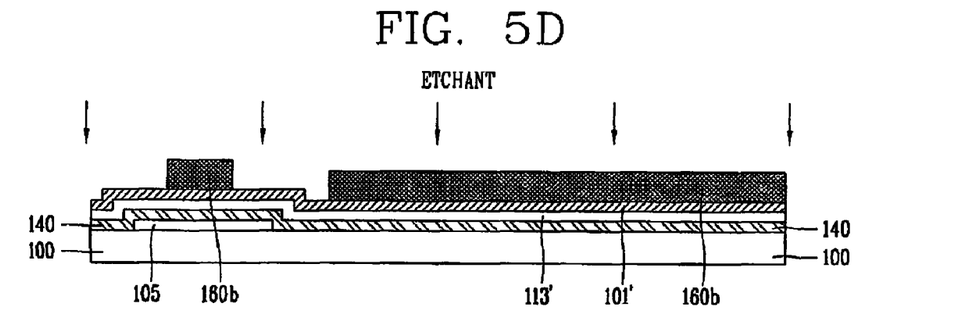

Then, as shown in FIG. 5D, a gate insulating layer 140 is formed on an entire surface of the first substrate 100, and then a first transparent conductive layer 113' and a first metal layer 101' are sequentially deposited on the gate insulating layer 140. The first transparent conductive layer 113' is formed of at least one material selected from a group including an indium tin oxide (ITO), an indium zinc oxide (IZO), or an indium tin zinc oxide (ITZO). The first metal layer 101' is formed of at least one material selected from a group including Mo, Mo alloy, Al, Al alloy, Ti, Ti alloy, Ta, Ta alloy, Co, Co alloy, Ni, or Ni alloy.

Figure 5E:
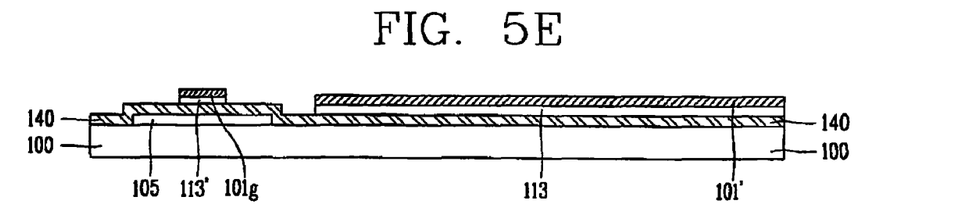

Next, a photoresist is deposited on the first transparent conductive layer 113' and the first metal layer 101', and then a second mask is positioned on the photoresist. Then, ultraviolet rays are irradiated onto the photoresist through a second mask and a developer is applied thereto, thereby forming a photoresist pattern 160b on the first metal layer 101'. When the first transparent conductive layer 113' and the first metal layer 101' are partially blocked by the photoresist pattern 160b, an etchant is applied thereon thus to simultaneously etch the first transparent conductive layer 113' and the first metal layer 101'. As a result, as shown in FIG. 5E, a gate line (not shown), a gate electrode 101g, and a first electrode 113 with a plate shape are formed. Because the gate line (not shown) formed of the first metal layer 101', the gate electrode 101g, and the first electrode 113 formed of the first transparent conductive layer 113' are simultaneously patterned, the gate line and the gate electrode 101g include a part of the first transparent conductive layer 113' at each lower portion thereof and the first electrode 113 includes a part of the first metal layer 101' at an upper portion thereof. That is, the gate line, the gate electrode 101g, and the first electrode 113 of a transparent conductive layer are simultaneously formed through a single mask process.

Figure 5F:
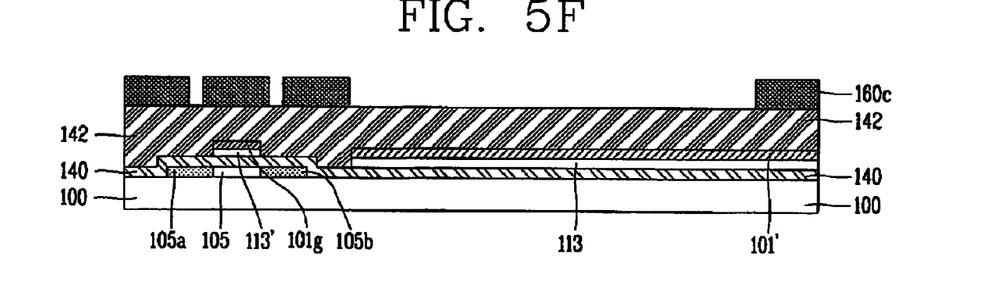

As shown in FIG 5F, impurity ions are injected into the active layer 105 by using the first gate electrode 101g as an ion injection mask, thereby forming a source region 105a and a drain region 105b in the active layer 105, respectively. Then, a laser beam is irradiated onto the source region 105a and the drain region 105b, thereby activating the source region 105a and the drain region 105b. The source region 105a and the drain region 105b are formed in order to enhance an ohmic contact with each electrode connected thereto, and are formed by metalizing a part of the active layer 105 by using impurity ions of a third group such as Boron. Impurity ions of a third group are used because a process for fabricating an LCD device using a polycrystalline silicon as an active layer is more simple than a process for fabricating an N-type thin film transistor. Thus, the LCD device is less inferior. Therefore, when fabricating an N-type thin film transistor, impurity ions of a fifth group such as Phosphorus are injected into an active layer to form a source region and a drain region.

Figure 5G:
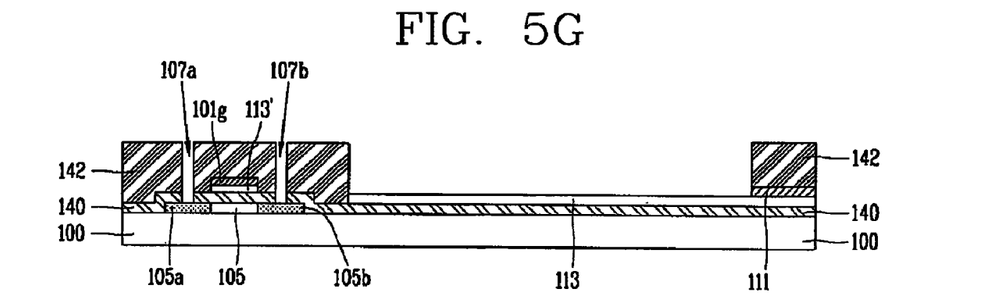

Upon completing the source region 105a and the drain region 105b by injecting impurity ions into the active layer, an intermediate layer 142 is deposited thereon and a photoresist pattern 160c is formed through a third mask process. Then, as shown in FIG. 5G; a first contact hole 107a and a second contact hole 107b for partially exposing the source region 160a and the drain region 160b are formed. At the same time, the first metal layer 101' and the intermediate layer 142 on the first electrode 113 are etched thereby to expose the first electrode 113. That is, the first contact hole 107a and the second contact hole 107b are formed by using a single mask process in a third mask process, and the first electrode 113 is formed to serve as an optical transmittance region. Herein, acid solution, such as hydrofluoric acid (HF) may be used as an etching solution.

Figure 5H:
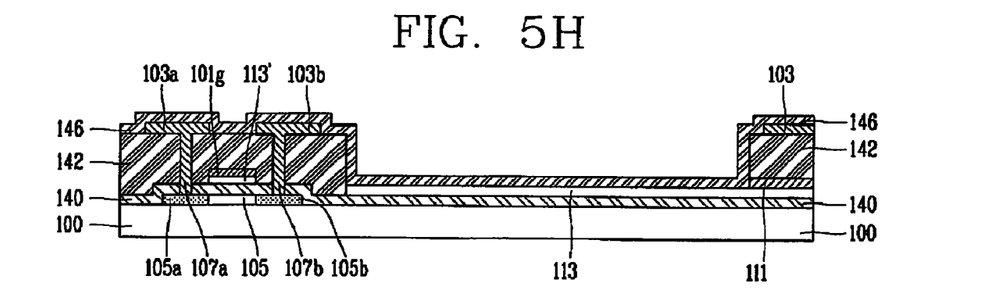

Then, as shown in FIG. 5H, a second metal layer formed of at least one material selected from a group including Mo, Mo alloy, Al, Al alloy, Ti, Ti alloy, Ta, Ta alloy, Co, Co alloy, Ni, or Ni alloy is deposited on the intermediate layer 142 where the first contact hole 107a and the second contact hole 107b are formed. Then, the second metal layer is patterned through a fourth mask process, thereby forming a data line 103, a source electrode 103a protruding from the data line 103, and a drain electrode 103b spaced from the source electrode 103a with a certain gap. Then, a chemical vapor deposition (CVD) method may be applied to an entire surface of the first substrate 100 where the source electrode 103a, the drain electrode 103b, and the data line 103 are formed, thereby depositing a passivation layer 146 thereon.

Then, the passivation layer 146 formed on the drain electrode 103b is partially etched by using a fifth mask, thereby forming a third contact hole 107c for electrically connecting the drain electrode 103b and the second electrode 115 to each other. Then, a second transparent conductive layer formed of an indium tin oxide (ITO), an indium zinc oxide (IZO), or an indium tin zinc oxide (ITZO) is deposited on the passivation layer 146. Herein, the second transparent conductive layer is patterned to be the second electrode 115 having a plurality of slits through a sixth mask process, and one side of the second electrode is connected to the drain electrode 103b through the third contact hole 107c.

Although not shown, a first alignment layer that determines an initial alignment direction of liquid crystal is deposited on the first substrate 100 and is rubbed. A color filter is formed on the second substrate fabricated separately from the first substrate, and a second alignment layer is deposited on the color filter thus to be rubbed. The first substrate 100 and the second substrate 200 are bonded to each other so that the first alignment layer and the second alignment layer face each other. Also, a liquid crystal layer is formed in a space between the first substrate 100 and the second substrate 200, thereby completing an LCD device having a high aperture ratio and a high optical transmittance.

Figure 5I:
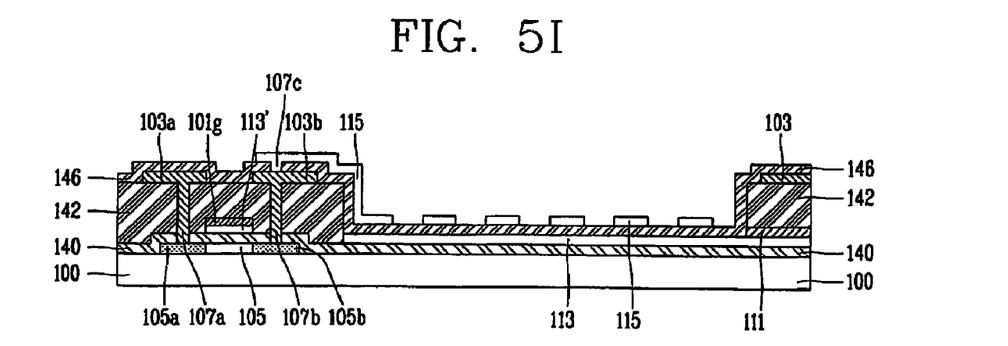

The LCD device according to the present invention has a different structure from the related art LCD device. As shown in FIG. 51, the transparent conductive layer 113' having a certain thickness is formed at each lower portion of the gate electrode 101a and the gate line. This is because the first metal layer 101' and the first transparent conductive layer 113' for the first electrode are sequentially deposited and then simultaneously patterned by using one mask.

In the related art IPS-mode LCD device, a first electrode for receiving a common signal and a gate electrode are formed on the same metal layer through the same mask process, or the first electrode is formed on the same transparent conductive layer as a second electrode through the same mask process. However, in the present invention, the first electrode and the second electrode that are respectively formed of a transparent conductive layer have to be formed at different layers in order to fabricate an LCD device having a high aperture ratio and a high optical transmittance. Therefore, two additional mask processes for respectively forming the first electrode and the second electrode are required besides a mask process for forming a gate electrode. In the method for fabricating an LCD device according to the present invention, a transparent conductive layer for forming the first electrode and a metal layer for forming the gate electrode are sequentially deposited, and the gate electrode and the first electrode are simultaneously patterned using one mask. Accordingly, the number of masks is reduced. Furthermore, even when a low temperature polycrystalline silicon type thin film transistor is provided as a switching device, an LCD device can be fabricated through six mask processes.

In the present invention, an additional mask process for forming the first electrode is not required, thereby simplifying the entire fabrication processes and reducing the fabrication cost.

In the first embodiment of the present invention, the first electrode is a common electrode for receiving a common signal, and the second electrode is a pixel electrode for receiving a data signal. However, as shown in the second embodiment of the present invention, the first electrode may be a pixel electrode and the second electrode may be a common electrode. In the step of partially etching the passivation layer, a certain region on the drain electrode is not opened but a certain region of the gate pad is opened at a dummy region of the LCD device in order to form the third contact hole.

As aforementioned, in the present invention, light is transmitted evenly through the electrode thereby to increase an optical transmittance and an aperture ratio thus to enhance the display quality.

Also, in the present invention, the number of masks is reduced to simplify fabrication processes, thereby increasing a fabrication yield of the LCD device.

Although not shown, the present invention comprises various modes for the LCD device, and various structures and arrangements for the pixel.

In the present invention, the first electrode and the second electrode of the transparent conductive layer for generating an electric field are formed at a different layer, respectively. Also, a distance between the first electrode and the second electrode is formed to be smaller than a cell gap so that a plurality of horizontal fields with a parabolic shape may be generated on the substrate. The gap between the slits of the second electrode are formed to be narrow enough for liquid crystal molecules to be manipulated by a horizontal electric field with a parabolic shape generated at both sides thereof, thereby driving all the liquid crystal molecules on the electrode. Therefore, in the IPS-mode LCD device of the present invention, an optical transmittance and an aperture ratio are more enhanced when compared with those of the related art IPS-mode LCD device.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for fabricating a liquid crystal display (LCD) device, comprising:
    preparing a first substrate having a first part and a second part;
    forming a polycrystalline silicon layer on the first substrate;
    patterning the polycrystalline silicon layer using a first mask process to form an active layer in the first part on the substrate, wherein the active layer directly contacts the substrate;
    forming a gate insulating layer on the first substrate including the active layer;
    sequentially forming a first transparent conductive layer and a first opaque metal layer on the gate insulating layer;
    simultaneously patterning the first transparent conductive layer and the first opaque metal layer using a second mask process to form a transparent gate line in the first part, a gate line on the transparent gate line, a transparent gate electrode in the first part, a gate electrode on the transparent gate electrode, a first electrode in the second part, and a first opaque electrode on the first electrode,
    forming a source region and a drain region in the first part on the active layer;
    forming an intermediate layer on the first substrate including the transparent gate line, the gate line, the transparent gate electrode, the gate electrode, the first electrode, and the first opaque electrode;
    simultaneously etching the gate insulating layer and the intermediate layer over the source region and the drain region and the intermediate layer over the first electrode using a third mask process, thereby a first contact hole and a second contact hole are formed in the gate insulating layer and the intermediate layer at the source region and the drain region in the first part on the active layer to expose a part of the source region and the drain region;

etching the first opaque electrode on the first electrode in the second part to expose the first electrode;

forming a second metal layer on the intermediate layer;

patterning the second metal layer using a fourth mask process to form a data line, a source electrode, and a drain electrode in the first part;

forming a passivation layer on the first substrate including the data line, the source electrode, the drain electrode, and the exposed first electrode;

partially etching the passivation layer on the drain electrode using a fifth mask process to form a third contact hole;

forming a second transparent conductive layer on the passivation layer; and patterning the second transparent conductive layer using a sixth mask process to form a second electrode in the second part, wherein a first side of the second electrode is connected to the drain electrode via the third contact hole, wherein the gate insulating layer at the source region and the drain region of the first part are simultaneously etched and the intermediate layer and the first opaque electrode on the first electrode in the second part are simultaneously etched, wherein the etching process of the gate insulating layer and the intermediate layer in the first part are conducted in the same mask process and the etching process of the intermediate layer and the first opaque electrode on the first electrode in the second part are conducted in the same mask process.

2. The method of claim 1, wherein forming a polycrystalline silicon layer comprises:

depositing an amorphous silicon layer on the first substrate; and annealing the amorphous silicon layer by laser beam.

3. The method of claim 1, wherein in forming a source region and a drain region, impurity ions are injected onto the active layer by using the gate electrode as an ion-injection mask.

4. The method of claim 3, further comprising irradiating a laser beam on the source region and the drain region to activate the source region and the drain region.

5. The method of claim 1, wherein in forming a first contact hole and a second contact hole to expose the first electrode, a wet etching using hydrofluoric acid (HF) solution is performed.

6. The method of claim 1, wherein the first electrode is a common electrode that receives a common signal, and the second electrode is a pixel electrode that receives a data signal from the drain electrode.

7. The method of claim 1, wherein when partially etching the passivation layer, a gate pad is opened.

8. The method of claim 7, wherein the first electrode is a pixel electrode connected to the drain electrode that receives a data signal, and the second electrode is a common electrode that receives a common signal.

9. The method of claim 1, further comprising:

forming a first alignment layer on an entire surface of the first substrate;

preparing a second substrate to face the first substrate;

forming a color filter on the second substrate;

forming a second alignment layer on the color filter;

bonding the first substrate and the second substrate to each other so that the first alignment layer and the second alignment layer face each other; and providing a liquid crystal layer between the first substrate and the second substrate.

10. The method of claim 9, further comprising rubbing the first alignment layer and the second alignment layer.

11. The method of claim 1, wherein the first transparent conductive layer and the second transparent conductive layer are formed of one of indium tin oxide (ITO), indium zinc oxide (IZO), and indium tin zinc oxide (ITZO).

12. The method of claim 1, wherein the first metal layer and the second metal layer are formed of one of Mo, Mo alloy, Al, Al alloy, Ti, Ti alloy, Ta, Ta alloy, Co, Co alloy, Ni and Ni alloy.

13. The method of claim 1, wherein the second electrode has a plurality of slits.

* * * * *